United States Patent [19]
Oliveros

[11] Patent Number: 5,696,504
[45] Date of Patent: Dec. 9, 1997

[54] 4 BIT BASED BINARY ENCODING TECHNIQUE

[76] Inventor: Ernesto Vidal Oliveros, 1329 Third Ave., Suite 392, Chula Vista, Calif. 91911

[21] Appl. No.: 689,068

[22] Filed: Jul. 30, 1996

Related U.S. Application Data

[63] Continuation-in-part of Ser. No. 508,188, Jul. 27, 1995, Pat. No. 5,600,314, and Ser. No. 555,420, Nov. 9, 1995.

[51] Int. Cl.$^6$ .................................................. H03K 17/94
[52] U.S. Cl. .................. 341/26; 341/20; 400/98; 395/887
[58] Field of Search .................. 341/26, 20, 22, 341/29; 364/709.12, 189, 887; 400/98; 395/421.02

[56] References Cited

U.S. PATENT DOCUMENTS

| | | | |
|---|---|---|---|
| 4,215,343 | 7/1980 | Ejiri | 345/27 |
| 4,442,506 | 4/1984 | Endfield | 341/22 |
| 4,520,457 | 5/1985 | Hagler | 395/764 |
| 4,520,475 | 5/1985 | Hanft | 400/98 |
| 4,799,144 | 1/1989 | Parrulk | 364/200 |
| 4,891,786 | 1/1990 | Goldwasser | 395/796 |
| 4,964,075 | 10/1990 | Saaver | 395/887 |
| 5,086,503 | 2/1992 | Chung | 341/22 |
| 5,121,472 | 6/1992 | Danish | 395/275 |
| 5,167,017 | 11/1992 | Sasaki | 395/145 |
| 5,187,797 | 2/1993 | Nielsen | 395/800 |
| 5,283,802 | 2/1994 | Lund | 395/155 |
| 5,305,449 | 4/1994 | Ulenas | 395/500 |
| 5,372,441 | 12/1994 | Louis | 341/22 |
| 5,377,358 | 12/1994 | Wakamura | 395/800 |
| 5,410,333 | 4/1995 | Conway | 341/20 |
| 5,448,240 | 9/1995 | Morito | 341/20 |
| 5,486,823 | 1/1996 | Tsai | 341/20 |
| 5,600,314 | 2/1997 | Oliveros | 341/26 |

OTHER PUBLICATIONS

Aitken, A. C., "The Case Against Decimalisation", Oliver and Boyd, Edinburgh and London, Sep. 12, 1962, pp. 5–22.

*Primary Examiner*—Jeffery Hofsass
*Assistant Examiner*—Albert K. Wong
*Attorney, Agent, or Firm*—Jones, Tullar & Cooper, P.C.

[57] ABSTRACT

An encoding method employs sixteen basic values, twelve numerical magnitudes and four directional modifiers. These values are the result combining binary digits in sets of 4 bits. The encoding method is utilized for encoding letters, symbols and programming commands. Letters are defined as numerical magnitudes altered by a directional modifier, symbols and commands are addressed as numerical magnitudes altered by two or more directional modifiers. An analog to digital encoding technique converts analog data into binary form by means of "breaking" an analog wave into a multitude of periodic waves, each wave with a particular wave-break, wave length and amplitude, supplying hence, an efficient and economical method for processing and storing binary information. An analog device describes the particular position of the sun at a given time, supplying therefor an apparatus that not only measures time but also describes space.

9 Claims, 10 Drawing Sheets

ASCII

American Standard Code for Information Interchange

| | | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| 10 | Hexadecimal | 0 | 1 | 2 | 3 | 4 | 5 | 6 | 7 | 8 | 9 | A | B | C | D | E | F |
| 12 | Dozal | θ | 1 | 2 | 3 | 4 | 5 | 6 | 7 | 8 | 9 | Q | K | ◁ | △ | ▷ | ▽ |
| 14 | 4-BIT Cuyte | 0 | 0 | 0 | 0 | 0 | 0 | 0 | 0 | 1 | 1 | 1 | 1 | 1 | 1 | 1 | 1 |
|  |  | 0 | 0 | 0 | 0 | 1 | 1 | 1 | 1 | 0 | 0 | 0 | 0 | 1 | 1 | 1 | 1 |
|  |  | 0 | 0 | 1 | 1 | 0 | 0 | 1 | 1 | 0 | 0 | 1 | 1 | 0 | 0 | 1 | 1 |
|  |  | 0 | 1 | 0 | 1 | 0 | 1 | 0 | 1 | 0 | 1 | 0 | 1 | 0 | 1 | 0 | 1 |

| 0 | 0 | 0 | 0 | 0 | NUL | SOH | STX | ETX | EOT | ENQ | ACK | BEL | BS | HT | LF | VT | FF | CR | SO | SI |
|---|---|---|---|---|---|---|---|---|---|---|---|---|---|---|---|---|---|---|---|---|
| 0 | 0 | 0 | 1 | 1 | DLE | DC1 | DC2 | DC3 | DC4 | NAK | SYN | ETB | CAN | EM | SUB | ESC | FS | GS | RS | US |
| 0 | 0 | 1 | 0 | 2 |   | ! | " | # | $ | % | & | ' | ( | ) | * | + | , | - | . | / |
| 0 | 0 | 1 | 1 | 3 | 0 | 1 | 2 | 3 | 4 | 5 | 6 | 7 | 8 | 9 | : | ; | < | = | > | ? |
| 0 | 1 | 0 | 0 | 4 | @ | A | B | C | D | E | F | G | H | I | J | K | L | M | N | O |
| 0 | 1 | 0 | 1 | 5 | P | Q | R | S | T | U | V | W | X | Y | Z | [ | \ | ] | ^ | < |
| 0 | 1 | 1 | 0 | 6 | ` | a | b | c | d | e | f | g | h | i | j | k | l | m | n | o |
| 0 | 1 | 1 | 1 | 7 | p | q | r | s | t | u | v | w | x | y | z | { | \| | } | ~ | ¤ |

| | θ | 1 | 2 | 3 | 4 | 5 | 6 | 7 | 8 | 9 | Q | K |
|---|---|---|---|---|---|---|---|---|---|---|---|---|
| ◁ | a | b | c | d | e | f | g | h | i | j | l | m |
| △ | A | B | C | D | E | F | G | H | I | J | L | M |
| ▷ | n | o | p | r | s | t | u | v | w | x | y | z |
| ▽ | N | O | P | R | S | T | U | V | W | X | Y | Z |

FIG. 4

| | | θ | 1 | 2 | 3 | 4 | 5 | 6 | 7 | 8 | 9 | Q | K | |
|---|---|---|---|---|---|---|---|---|---|---|---|---|---|---|
| | | | | | | | | | | | | | | 4 bits |
| ◁ | | a | b | c | d | e | f | g | h | i | j | l | m | 8 bits |
| ◁△ | | + | − | ⓒ | × | / | " | _ | ; | ) | * | q | k | 12 bits |
| ◁△△ | | α | β | δ | ∈ | π | φ | γ | ύ | ι | ξ | λ | Ω | 16 bits |
| ◁△△▽ | | ♈ | ♉ | ♊ | ♋ | ♌ | ♍ | ♎ | ♏ | ♐ | ♑ | ♒ | ♓ | 20 bits |
| ◁△△∘∘∘▷ | | キ | イ | ス | ラ | ム | フ | ヲ | ホ | ネ | エ | カ | | n+4 bits |

FIG. 5

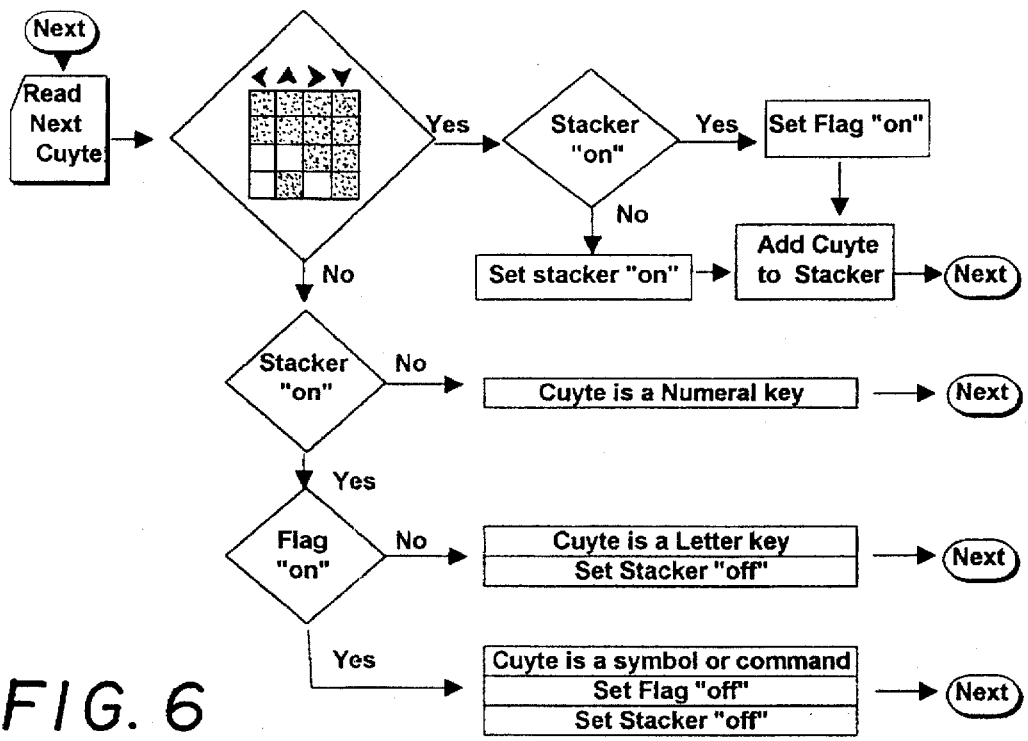
FIG. 6
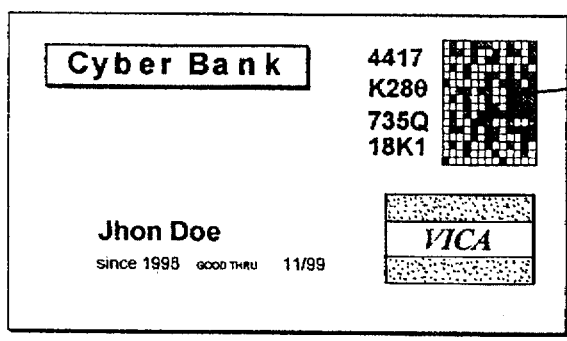
FIG. 7
| 4AD5F534 | 67C8A345 | 12A4A245 |
| 34FED456 | 23FED42D | 67BE56C4 |
| 2AB746FF | 4B89C6C4 | 4AF9F445 |
FIG. 8a
23A45▷5▷ QKA7≪563KA▷
2▽5 ▷789▷455A8 ◁1998 ▷
234▷ 25 A 567◁A 345▷▷56
FIG. 8b

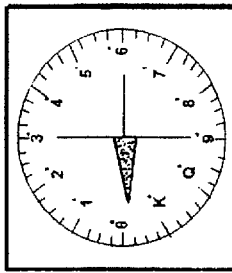
FIG. 15e
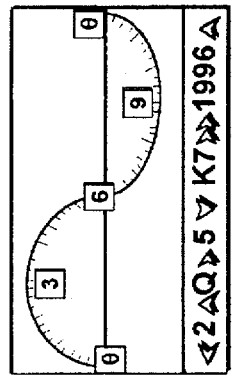
FIG. 15f
FIG. 15d
FIG. 15c
FIG. 15g
FIG. 15b
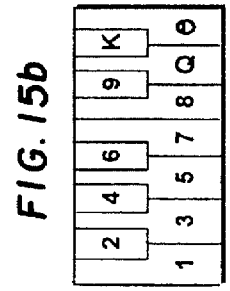
FIG. 15a
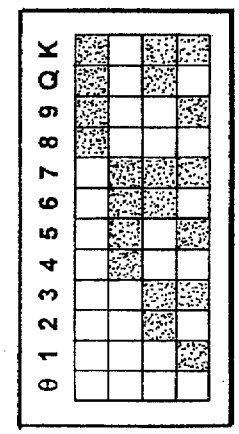

| A | B | C |
|---|---|---|
| Ace | Bee | Cee |
| D | E | F |
| Dee | Ea | Fee |
| G | H | I |
| Gee | Hee | I |
| J | L | M |
| Jee | Lee | Mee |

| 1 | 2 | 3 |
|---|---|---|
| One | Two | Three |
| 4 | 5 | 6 |
| Four | Five | Six |
| 7 | 8 | 9 |
| Seven | Eight | Nine |
| Q | K | θ |
| Cue | Cay | Off |

| N | O | P |
|---|---|---|
| En | Ou | Pee |
| R | S | T |
| Ree | Sea | Tee |
| U | V | W |
| You | Vee | Wee |
| X | Y | Z |
| Ex | Why | Zee |

*FIG. 16a*

| a | b | c |
|---|---|---|
| al | bel | cel |
| d | e | f |
| deal | eal | feal |
| g | h | i |
| geal | heal | ile |
| j | l | m |
| jel | el | mel |

| ! | ? | £ |
|---|---|---|
| on | sec | pound |
| ( | $ | ) |
| par | dint | peer |
| \ | & | @ |
| bac | and | at |
| q | k | φ |
| cute | cayte | teen |

| n | o | p |
|---|---|---|
| neal | owl | pel |
| r | s | t |
| rel | sel | tel |
| u | v | w |
| ul | vel | wel |
| x | y | z |
| xel | yel | zeal |

*FIG. 16b*

| $ | Z̸ | N̸ |
|---|---|---|
| sine | zune | tan |
| S̸ | Z̸ | N̸ |
| cosin | cozun | cotan |
| ∏ | Σ | Σ |
| pi | sum | zeam |
| @ | ! | = |
| smaller | greater | equal |

| 1 | 2 | 3 |
|---|---|---|
| One | Two | Three |
| 4 | 5 | 6 |
| Four | Five | Six |
| 7 | 8 | 9 |
| Seven | Eight | Nine |
| Q | K | θ |
| Cue | Cay | Off |

| + | ^y | >y |
|---|---|---|
| plus | times | raise |
| - | ˅y | <y |
| minus | deep | root |
| ( | ^x | >x |
| par | link | leap |
| ) | ˅x | <x |
| peer | lean | low |

*FIG. 16c*

| Nums | | Teen Numerals | | | |
|---|---|---|---|---|---|
| θ | Off | 1θ | Teen | 2θ | Tweenty |
| 1 | One | 11 | Onteen | 21 | Tweenty one |
| 2 | Two | 12 | Secteen | 3θ | Theerty |
| 3 | Three | 13 | Thirteen | 31 | Theerty one |
| 4 | Four | 14 | Fourteen | Qθ | Queenty |
| 5 | Five | 15 | Fifteen | Q1 | Queenty one |
| 6 | Six | 16 | Sixteen | Q2 | Queenty two |
| 7 | Seven | 17 | Seventeen | QQ | Queenty cue |
| 8 | Eight | 18 | Eighteen | Kθ | Kingty |
| 9 | Nine | 19 | Nineteen | K1 | Kingty one |
| Q | Cue | 1Q | Cueteen | KK | Kingty cay |
| K | Cay | 1K | Cayteen | 1θθ | Gross |

FIG. 17a

| Number | Letter Notation | Scientific E-format |
|---|---|---|
| 1'θθθθ' | 1 G' | 1.00E+12 |
| 1'θθθθ' | 1 F' | 1.00E+08 |
| 1'θθθθ' | 1 E' | 1.00E+04 |
| 1θθθ' | 1 D' | 1.00E+03 |
| 1θθ' | 1 C' | 1.00E+02 |
| 1θ' | 1 B' | 1.00E+01 |
| 1' | 1 A' | 1.00E+00 |
| '1 | 1 a' | 1.00E-01 |
| 'θ1 | 1 b' | 1.00E-02 |
| 'θθ1 | 1 c' | 1.00E-03 |
| 'θθθ1 | 1 d' | 1.00E-04 |
| 'θθθθ,1 | 1 e' | 1.00E-05 |
| ,θθθθ,1 | 1 f' | 1.00E-09 |
| ,θθθθ,1 | 1 g' | 1.00E-13 |

FIG. 17b

| Context | Symbol | Units | Example | Scientific E-format |
|---|---|---|---|---|
| circular | 1● | dots | 1234 G● | 1.234 E+15 |
| time | 1: | chrons | 6 f: | 6.0 E-09 |
| distance | 1' | coms | 34Q3' | 3.4Q3 E+03 |
| area | 1" | crads | K34Q E" | K.34Q E+07 |
| volume | 1∶ | cubes | 5678 ∶ K | 5.678K E+03 |
| frecuency | 1Ç | chans | 34Q1 eÇ | 3.4Q1 E-05 |
| currency | S | dints | K234 $ | K.234 E+03 |
| wheight | 1£ | pounds | 14 £ 56 | 1.456 E+01 |

FIG. 17c

| Nums | | Numeros Dozales | | | |
|---|---|---|---|---|---|
| θ | Off | 1θ | Docen | 2θ | Veinten |
| 1 | Uno | 11 | Oncen | 21 | Veintuno |
| 2 | Dos | 12 | Bicen | 3θ | Trintan |
| 3 | Tres | 13 | Trecen | 31 | Trintuno |
| 4 | Cuatro | 14 | Catorcen | Qθ | Reyna |
| 5 | Sinco | 15 | Cincen | Q1 | Reynunio |
| 6 | Seis | 16 | Seisen | Q2 | Reynados |
| 7 | Siete | 17 | Sieten | QQ | Reynacu |
| 8 | Ocho | 18 | Octen | Kθ | Rey |
| 9 | Nueve | 19 | Noven | K1 | Reyuno |
| Q | Cu | 1Q | Cusen | KK | Reyca |
| K | Ca | 1K | Casen | 1θθ | Gross |

FIG. 18a

| Numero | Notacion Letra | Formato-E Cientifico |
|---|---|---|
| 1'θθθθ' | 1 G' | 1.00E+12 |
| 1'θθθθ' | 1 F' | 1.00E+08 |
| 1'θθθθ' | 1 E' | 1.00E+04 |
| 1θθθ' | 1 D' | 1.00E+03 |
| 1θθ' | 1 C' | 1.00E+02 |
| 1θ' | 1 B' | 1.00E+01 |
| 1' | 1 A' | 1.00E+00 |
| '1 | 1 a' | 1.00E-01 |
| 'θ1 | 1 b' | 1.00E-02 |
| 'θθ1 | 1 c' | 1.00E-03 |
| 'θθθ1 | 1 d' | 1.00E-04 |
| 'θθθθ,1 | 1 e' | 1.00E-05 |
| ,θθθθ,1 | 1 f' | 1.00E-09 |
| ,θθθθ,1 | 1 g' | 1.00E-13 |

FIG. 18b

| Contexto | Simbolo | Unidades | Ejemplo | Formato-E Cientifico |
|---|---|---|---|---|
| circular | 1• | dots | 1234 G• | 1.234 E+15 |
| tiempo | 1: | crons | 6 f: | 6.0 E-09 |
| distancia | 1' | coms | 34Q3' | 3.4Q3 E+03 |
| area | 1" | crads | K34Q E" | K.34Q E+04 |
| volumen | 1: | cubos | 5678 : K | 5.678K E+03 |
| frecuencia | 1Ç | chans | 34Q1 eÇ | 3.4Q1 E-05 |
| moneda | S | dints | K234 $ | K.234 E+03 |
| peso | 1£ | paund | 14 £ 56 | 1.456 E+01 |

FIG. 18c

4 BIT BASED BINARY ENCODING TECHNIQUE

CROSS REFERENCE TO RELATED APPLICATIONS

This is a continuation-in-part of application Ser. Nos. 08/508,188, filed Jul. 27, 1995 and issued as U.S. Pat. No. 5,600,314, and Ser. No. 08/555,420, filed Nov. 9, 1995, pending.

BACKGROUND OF THE INVENTION

The present invention relates in general to an encoding procedure which transforms analog and digital information into a system of 4-bit code words.

I wonder, who invented the clock? . . . The first civilization that we know measured time were the Sumerians, which 6,000 years ago divided the day in twelve periods, six for the day and six for the night. The Sumerians had a sexadecinal systen (base-60). The clock we presently use, where an hour is divided into 60 minutes and a minute is divided into 60 seconds is based on that system. But they did not invent the clock, if they had designed it, the clock would be divided into six or ten fractions. Sumerians merely adapted the clock to their numerical system, some other civilization with a high degree of technical abilities had to teach them to divide the day into a dozen fractions. Then we may ask, why is it divided in twelve sectors instead of ten or six? . . . No human alive with 10 digits (fingers) can answer these questions. Nevertheless, it would be helpful to describe the numerical context in which we live. The clock has 12 numbers but only 10 numerals (0 through 9). The telephone has 12 keys but only 10 digits (numerals). The piano has 7 white keys but 12 semitones in each octave (base-12). The compass comprises 32 points of individual directions (base-4) but the circle is divided in 360 degrees (base-60). Computer information is input in decimal form but the microprocessor works with hexadecimal data (base-16). One foot is divided into 12 inches but one half inch is written 0.5 (instead of 0.6). The year is divided into 12 months although is described in a decimal system (base-10). The reader may wonder, is there any base that can substitute all the others? How did we end up with this confusing hybrid base-8/10/12/16/60 system? . . .

It all started in France, more than 200 years ago with the fall of la Bastille in 1789. Arts and Science flourished during the French revolution and the Commission on Weights and Measures was established. Five prominent mathematicians were assigned to the commission, Lagrange, Borda, Condorcet, Monge and Laplace who wrote:

"It is India that gave the ingenious method of expressing all numbers by mean of ten symbols".

Laplace and the naturalist Buffon who lived in England for some time, developed the concept that a base-12 system (hereinafter referred to as the Dozal system) should be established, with the argument of divisibility which relies on the fact that the number 12 is divisible by the numbers 2, 3, 4, and 6 versus number 10 which only can be divided by 2 and 5. With the dozal base, time and space could be bound, the Sumerian 12-hours-a-day system could be tied with the English 12-inches-to-the-foot method. Buffon however, died a year before the revolution started. Lagrange favored the decimalists (although later regretted), Laplace was a dozalist, but unfortunately for the world, he was ousted in December 1793. A new Commission was formed comprised of "Only true republicans" as Monge put it.

The metric system was officially adopted by decree on Dec. 10, 1799. When Napoleon invaded continental Europe, the decimal system (base-10) became the model.

In America, the first modern "Type-Writer" was patented in 1867, by a Milwaukee inventor named Christopher Lathan Sholes. This inventor borrowed the concept of a "modifier" from the English language (inherited from the Latin) and patented the "SHIFT" key. In the English language, adjectives "modify" nouns, adverbs "modify" verbs, the shift key then, does not operate by itself, but when pressed down modifies the outcome of the actuation of the next key. When the first computers were manufactured, a 3-bit code word encoding technique was developed and the octal system (base-8) became the standard. The problem with this method was that ten numbers could not be represented in 3-bit form. When the computers started to work with code words of 4 or more bits, a hexadecimal procedure (base-16) was developed. To allow humans to more readily represent the inner workings of computers. This method is the result of combining binary quantities of 1's and 0's in sets of 4 bits.

The American Standard Code for Information Interchange, otherwise known as ASCII was created in 1966 on the basis of a keyboard used on a key-punched card mainframe computer. It was based on a seven binary digit representations of the various characters that can be entered on a conventional keyboard. Shift keys modify letter keys, adverbs modify verbs, but in conventional binary coding systems such as ASCII or IBM's EBCDIC, no hexadecimal quantity has been assigned as a "modifier". Each of the 16 available quantities has a magnitude value. With the ASCII code, numbers, letters, symbols, or commands can be represented by means of two hexadecimal numerals. Although numerous efforts have been made to establish another digital encoding technique, the ASCII code remains the industry standard, in spite of the fact that it is not a particular efficient digital code. It is evident that a new binary encoding technique is needed. One of those ventures was made in recent years when several vendors got together to establish a common universal binary code known as the UNICODE which is a 16-bit code used by Windows® NT or some UNIX® versions. With the upcoming popularity of the Internet, the HTML digital encoding technique adds more salsa to the already hefty list of binary encoding procedures. Nevertheless, all of these codes are still constructed on the basis of a hexadecimal, base-16 system.

On the other hand, to transform analog information into digital form, that is, into binary 1's and 0's, a "sampling" procedure has been devised. This technique takes sample points of an analog wave at predetermined sample times, unfortunately such a method is either inaccurate or bit-consuming. In other words, it needs a multitude of bits to describe a small sample or does not reflect the real trend of the analog wave.

SUMMARY OF THE INVENTION

To address the foregoing problems, it is the object of the present invention to provide an accurate and economical binary encoding technique based on the sixteen basic values which result from combining 1's and 0's in sets of 4 binary digits. The digital encoding method described herewith, not only reduces the number of bits needed to describe an analog wave but also furnishes an economical binary method for encoding and storing numbers, letter, symbols and computing commands. It is also the purpose of the present invention to demonstrate that a dozal system (base-12) could substitute all the other bases presently used. With a circle divided into a dozen fractions, the present invention provides analog device 5 based on the dozal method that not only measure time but also space. In order to accomplished the referred goals, the present invention is based on Applicant's principle, known as the Vidal Principle, which asserts that:

"The Universe can be fairly explained by means of sixteen basic values, a dozen numerical magnitudes (hums) and four directional modifiers (ars)."

The Vidal Principle claims therefore, that the exact equilibrium between nums and ars is 12/4 (twelve by four). More particularly, the present invention provides a novel encoding technique which transforms analog and digital information into 4-bit code words known as "cuytes". In accordance with the Vidal Principle a digital encoding method can be developed by means of 16 cuytes, a dozen for numerical magnitudes known as "nums" and the remaining four as directional modifiers called "ars". This technique provides a more efficient coding method than does the conventional ASCII system because nums are each defined by a single cuyte (4 bits); this enables the microprocessor to process numbers more quickly and reduces by half the amount of memory storage space required to store them. The four directional modifiers called ars are also represented by a single cuyte. Letters of the alphabet are defined by two cuytes, one ar followed by one num. Special symbols or computing commands are defined by three or more cuytes, that is, two or more ars ending with a num. The simplicity of the cuyte-based coding technique, relies on the fact that letters, symbols and computing commands are encoded as a series of ars followed by nums. The set formed by a sequence of ars followed by a number is called a "bryte" and is the basis of the analog to binary form conversion technique of the present invention.

To develop a comprehensive analog and digital encoding procedures on the basis of 4-bit code words, a dozal numerical method known as the "teen-metric system" is established. With such a procedure, numbers are formed through the basis of the dozen nums: $_\theta$, 1, 2, 3, 4, 5, 6, 7, 8, 9, Q, K. In this particular arrangement the number zero is substituted for the num "Off" written as the Greek letter theta $_\theta$. Characters Q and K correspond to the decimal numbers 10 and 11 respectively and number $1_\theta$ represents the decimal number 12 which instead of "ten", it is called "teen". As 200 years ago the French mathematician Laplace would have suggested, with this particular arrangement, the Sumerian time-system (a day divided by a dozen fractions) is tied to the English spatial procedure (a dozen inches make a foot) to the Piano musical method (a dozen semitones make an octave) and to the Gregorian Calendar (a dozen months make a year).

Based on the Sumerian concept developed 6000 years ago, for dividing a day into a dozen fractions, the present invention provides an analog device named the "sunter" (sun-hunter) which is conveniently divided into 12 sectors. The sunter describes the particular position of the sun at a given "dot". As an example, sunrise starts at $_\theta$ dots, noon at 3, sunset at 6 and midnight at 9. Thanks to the teen-metric system which provides two additional characters, the sunter starts at off and ends at off. It is important to notice that the sunter not only provides an efficient method for measuring time, but also for describing the position of a specific object at a given time. A sunter therefor, is an analog device that not only describes TIME but also SPACE.

A sunter can be then, split into a sine wave, with the particular advantage that it does not need to use negative values to describe a sample point in its lower part. The bryte-based coding technique, converts analog information into binary form by means of "brytes" which comprise strings of ars followed by nums. In this procedure, any analog wave is broken into smaller periodic waves, each with a particular amplitude, frequency and "wave-break". The four ars thus describe the frequency (left and right) and the amplitude (up and down). The dozen nums depict each wave-break representing a change of function in the analog wave, describing hence, a precise point in the sunter. As an example a wave-break of 8´6 dots is a sample point between 8 and midnight (9 dots). In conventional methods, the conversion of analog data into digital form is limited by the "interval."(time between two sample points) and by the number of "bands" used. With the bryte-based coding technique, accuracy is defined by the numbers of "ars" that are employed to describe the frequency and amplitude of each sine wave as well as the "nums" use to define the "wave-break". The present invention therefore, provides a more accurate and economical encoding procedure for describing analog information in binary form and supplies a scalar digital method for encoding numbers, letters, symbols and computing commands which is considerably more efficient and easy to structure.

The implications behind this new 4 binary digit code word procedure are quite important, the present invention forecasts that a dozal system (base-12) will replace the conventional decimal system, and that the remaining four values which result from the aforementioned technique must be assigned to the basic 4 directions, as modifiers.

BRIEF DESCRIPTION OF THE DRAWINGS.

The features and advantages of the present invention will become apparent from the following detailed description of a preferred embodiment thereof, taken in conjunction with the accompanying drawings, in which:

FIG. 1 illustrates a map describing the digital encoding procedure for the American Standard Code for Information Interchange known as ASCII;

FIG. 2 illustrates the graphical description of the sixteen 4 bit binary code words for the digital encoding method of the present invention;

FIG. 3 illustrates a digital keyboard where each key is assigned with one of the sixteen values which result from the binary method described in FIG. 2;

FIG. 4 illustrates the binary encoding technique for the letter group;

FIG. 5 illustrates the binary encoding technique for symbols and programming commands;

FIG. 6 is a flow chart illustrating the operation of a decoder software program for use with the binary encoding technique that is employed with the preferred embodiment of the present invention;

FIG. 7 illustrates a credit card with a hologram based on the binary encoding procedure of the present invention;

FIGS. 8a and 8b illustrate a comparison between a convention hexadecimal system and the digital code based on the encoding technique of the present invention;

FIGS. 15a–g portray the topology of a "dozer";

FIGS. 16a–c are charts that illustrates the Hylan/teen system;

FIGS. 17a–c are charts that illustrate the teen-metric system in Hylan; and

FIGS. 18a–c are charts that illustrate the teen-metric system in Spanish.

DETAILED DESCRIPTION OF THE PREFERRED EMBODIMENT

Figure 9:
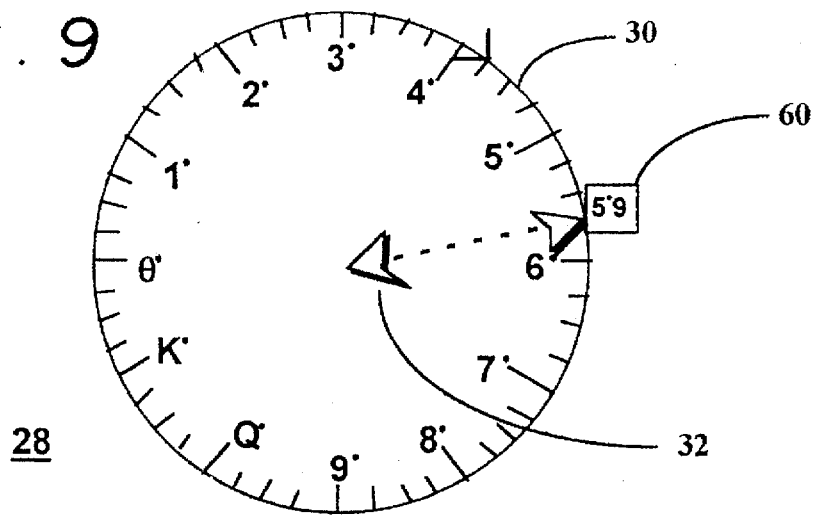
FIG. 9 illustrates an analog device that measures time and space.

Turning now to a detailed consideration of the preferred embodiment of the present invention, FIG. 1 illustrates a map describing the digital encoding procedure for the American Standard Code for Information Interchange known as ASCII. This encoding technique is based on a hexadecimal code 10 which depicts the 16 different combinations that result from combining 1's and 0's in sets of 4 bits. Each of these 16 quantities is identified by a unique 4-bit binary code word known as a "cuyte" 14.

In the hexadecimal method illustrated in FIG. 1, each cuyte 14 is assigned with a numerical magnitude which can be compared with the dozal method 12 (base-12) known as the teen-metric system which comprises a dozen numerical magnitudes called "nums" and four directional modifiers known as "ars". In this dozal method, characters $_\theta$, 1, 2, 3, 4, 5, 6, 7, 8, 9, Q and K are assigned as nums, facilitating then, a dual numeric system which enables one to use either the conventional decimal or the teen-metric system. In such a method, the number zero is substituted by the numeral "off", written as the Greek letter theta $_\theta$, characters Q and K correspond to decimal numbers ten and eleven and the number $1_\theta$ represents the decimal number 12 and it is called "teen".

Based on the Vidal Principle, a novel digital encoding procedure is developed by means of the 16 cuytes; 12 nums and 4 ars. The cuyte-based coding technique for the 16 quantities has a graphic representation in which every bit of each cuyte 14 is depicted either by a filled (shaded) box which represents a binary 1, or an empty (unshaded) box which represents a binary 0. FIG. 2 illustrates each of the sixteen cuytes 14 represented by four squares arranged in a vertical stack from bottom to top. The symbol corresponding to each of the cuytes is printed above the corresponding cuyte 14 code representation. The use of single cuytes for each of the numeral keys is particular advantageous and economical because numbers can be represented by half the amount of binary digits required in the conventional ASCII or EBCDIC codes, thus reducing memory storage space and processor execution time.

FIG. 3 illustrates a novel digital keyboard comprised of 16 keys known as the hexer 18, where each key is assigned with each of the 16 available cuytes. Different key actuations on the hexer 18 combine to provide a method for digital encoding letters, symbols, programming commands and diverse topologies. FIG. 4 portrays the digital encoding technique for the letter group which is addressed by two cuytes, one "num" modified by one "ar". In other words, letters of the English alphabet can be represented by one of the dozen numerical magnitudes modified by one of the four directional modifiers (up-ar, left-ar, right-ar, down-ar). As illustrated in FIG. 4, the upper case "A" is represented by the "up-ar" which modifies the num "off", while the lower case "a" is represented by the "left-at" which modifies the hum "off". Symbols and programming commands are addressed by three or more cuytes. This technique requires consider-ably fewer bits than conventional procedures such as ASCII or EBCDIC codes. FIG. 5 illustrates the scalar nature of the referred encoding procedure for symbols and programming commands. With this procedure a symbol or programming command can be described as a series of ars which modify a num. For example, the command "cut" is represented by 24 bits (three characters times eight bits per character) in the conventional ASCII code, but with the cuyte-based coding technique, it can be addressed by as few as 12 bits (e.g., one cuyte for the left-ar, one cuyte for the up-ar, and finally one cuyte for the num 2). With the cuyte-based coding technique, any letter, symbol or programming command, can be addressed through a plurality of ars which modify a num.

The flow chart illustrated in FIG. 6 shows how the digital decoder program functions when the microprocessor "reads" information encoded in a cuyte coding form. The program distinguishes between a one cuyte "num" code, a two cuyte letter code, and a three or more cuyte code which corresponds to symbols or programming commands. In addition, the decoder program employs a key-flag and a bit-stacker flag to differentiate among numbers, letters and multiple cuyte codes.

The proposed method is a better alternative than the conventional bar coding method, given the fact that it not only encodes numbers but also letters, symbols or commands. FIG. 7 illustrates a credit card with a hologram based on the encoding procedure of the present invention. This graphical representation is called a cuytegram 22, and portrays that with the cuyte-based coding system more information can be scanned in the same available space as in conventional bar coding methods. It must be pointed out though, that cuytegram 22 can not only be used as a 2 dimensional scanning map, but also as a 3 dimensional storing system.

FIGS. 8a and 8b illustrate a comparison between the conventional hexadecimal system depicted in FIG. 8a where the information is written in sets of 32 bits which correspond to 4 bytes per set, 2 hexadecimal numerals per byte, and the cuyte-based procedure illustrated in FIG. 8b where the data is written as series of ars followed by nums. With the cuyte-based coding method, the operator does not need to define the length of the code words (8-bit, 16-bit, 32-bit) because all the data is written as a continuous flow of characters which represent 4 bits each. Microsoft®'s Windows® 3.1 was constructed in a 16-bit context, Windows® 95 was assembled in a hybrid 16/32-bit environment. Operating systems in the future, however, can be developed on a 4-bit basis thanks to the cuyte-based coding method. In the same manner, microprocessor, memory cards or hard disks can be manufactured on a 4-layer platform, layer for each bit.

FIG. 9 illustrates an analog device called "the sunter" (sun-hunter) 28 which is conveniently divided in a dozen equi-distant "dots". The sunter 28 can then be used for describing the position or "dot" of the sun at a particular "chron" of the day, where 1 chron equals 1 day divided by 12, or 2 hours. As an example, sunrise is at $_\theta$˚ dots, noon at 3˚, sunset at 6˚ and midnight at 9˚. Each dozal dot is then divided into a dozen a-dots, each a-dot is divided into a dozen b-dots each b-dot into teen c-dots and so on. The sunter 28 not only supplies a method for measuring time but also for describing the position of a sample point at a particular time. Thanks to the teen-metric system which provides two additional characters, the sunter starts at off and ends at off. The sunter (base-12) thus, replaces the compass which comprises 32 points or individual directions (base-4), and substitutes the method for describing a circle in 360 degrees (base-60), rendering a more accurate and efficient technique for describing the geographical position or "dot" of a sample point at an specific time or "chron". A sunter 28 hence, is an analog device that not only measures TIME but also SPACE.

Figure 10:
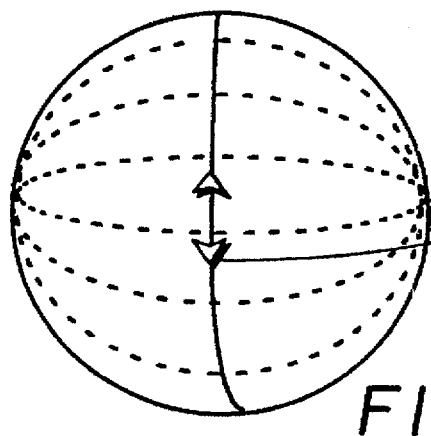
FIG. 10 depicts the encoding procedure of the present invention for a sphere.

FIGS. 9 and 10 graphically illustrate the digital encoding method for describing the geographical position of a sampled point in a 3-dimensional sphere. Nums are used to describe the position of a sample point in the sunter, s circumference 30. Left-ars and right-ars are used to "modify" the position of a sampled point along the sunter's radius 32. Finally, as illustrated in FIG. 10, Up-ars and down-ars are used to modify the position of the sampled point among the sphere, s slides 34. The present invention hence, provides a simple method for describing, in binary form, the relative 3 dimensional position of a sample point of different topologies. This digital procedure consists of a series of "nums" modified by "ars". A bryte then, is a digital code word described as a string formed by a series of ars ending with a number.

Figure 11:
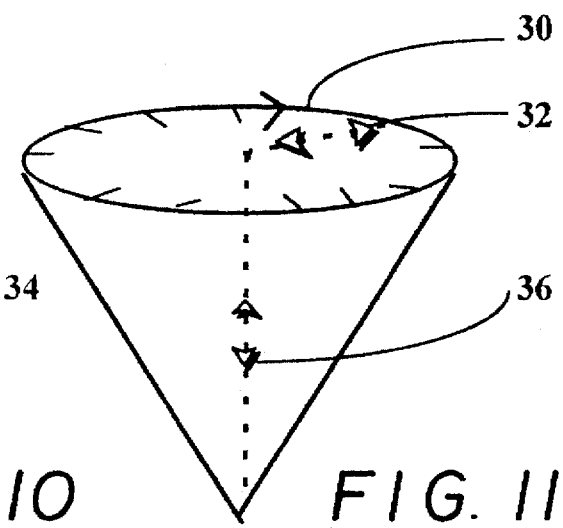
FIG. 11 illustrates a "lyte-cone" used to describe the time-space-light paradigm.

FIG. 11 illustrates the "lyte cone" used by physicists to describe the time-space-light paradigm. With the bryte-based encoding technique of the present invention, "nums" are used to describe a sample point positioned around the top of the lyte cone which corresponds to a sunter, s circumference 30, left-ars and right-ars define the movement of a sample point along the sunter's radius 32. Down-ars and up-ars are used to describe the movement of a sample point along the cone's base 36 which is transversal to the cone's top.

Figure 12:
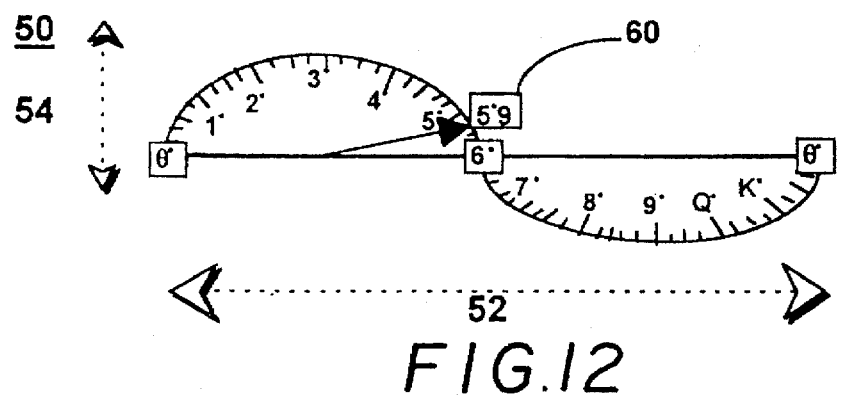
FIG. 12 depicts the binary encoding technique of the present invention for a periodic wave.

FIG. 12 illustrates the graphical description for the proposed digital encoding method for a periodic wave, such as in which a sine wave, a sunter is split into a "teen wave" 50. The teen wave 50 is a sine wave or other periodic wave which is conveniently divided into a dozen dots with the particular advantage that it does not need to use negative values to describe a sample point in its lower part. Each dozal dot, can then be consecutively divided into a dozen fractions. The other two variables needed to properly define a sine wave or other periodic wave are the wave length or period 52 and the wave's amplitude 54.

Figure 13A:
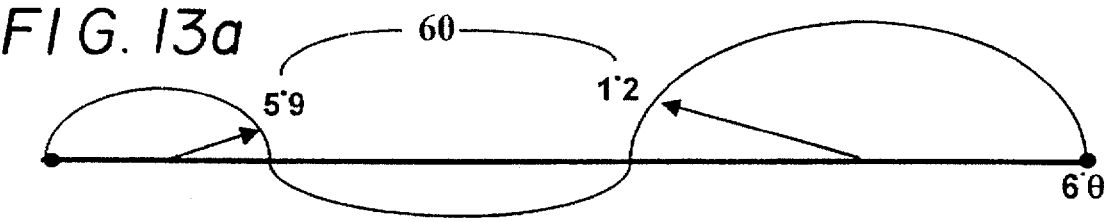
FIGS. 13a–e illustrate the analog to digital conversion technique of the present invention.

The present invention provides thus, a method for converting an analog wave into binary form. FIGS. 13a. through 13e. describe this procedure, where any analog wave is broken into a plurality of teen waves 50, each with a particular amplitude 54, wave length or period 52 and wave-break 60. This coding technique, converts analog information into binary form by means of "brytes 56" which comprise strings of ars followed by a number. Based on the Vidal Principle, the four "ars" are used to describe the wave length or period 52 (left-ar and right-ar) and the amplitude 54 (up-ar and down-ar). The dozen nums hence, are used to describe the precise position of a wave break. Each wave-break then, represents a change of teen wave function in the sampled analog wave and it is measured as a "dot" in the teen wave 50.

Figure 13B:
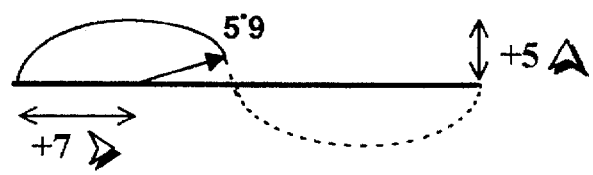
Figure 13C:
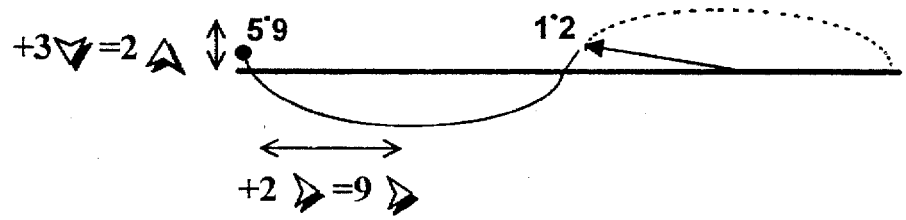
Figure 13D:
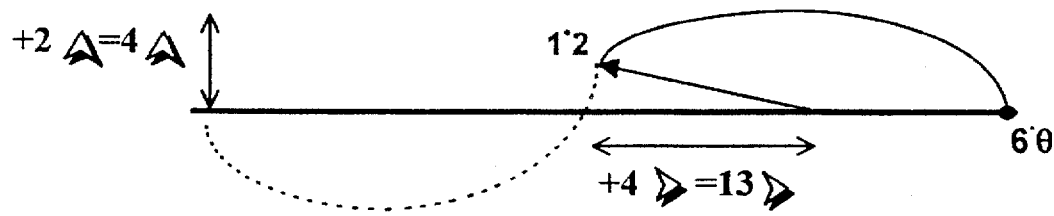

FIGS. 13a–e. illustrate an example of the bryte-based encoding technique known as "wave-breaking" where an analog wave can be split into a multitude of teen waves 50, each with a particular wave length 52, amplitude 54 and wave-break 60. FIG. 13.a shows a "sampled" analog wave that by definition always starts at "$_{\ominus}$ dots". FIG. 13b. portrays a period wave in which the solid line represents the part of that particular periodic wave with the same function as the sampled analog wave. Given the fact that, the periodic wave depicted in FIG. 13b. is the first one to be converted into binary form, the wave length 52 and amplitude 54 are described by the total width and height of the period wave in terms of "ars"; subsequent descriptions are based on ars which modify the first period wave function in terms of "increments or decrements" of the previous wave lengths and amplitudes. The periodic wave in FIG. 13b. has a ¼ wave length (width) of 7 right-ars, an amplitude (height) of 5 up-ars and a wave-break at 5°8 dots. FIG. 13c. portrays a periodic wave with a ¼ wavelength "increased" by 2 right-ars, an amplitude "decreased" by 3 down-ars and a wave-break at 1˙2 dots. By the same token, FIG. 13.d portrays a periodic wave with a ¼ wave length "increased" by 4 right-ars, an amplitude "increased" by 2 up-ars and a wave-break at 6˙$_{\ominus}$ dots (sunset).

Figure 13E:
Figure 14A:
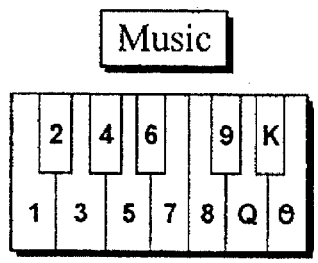
FIGS. 14a–d illustrate the construction of a "dozer"
Figure 14B:
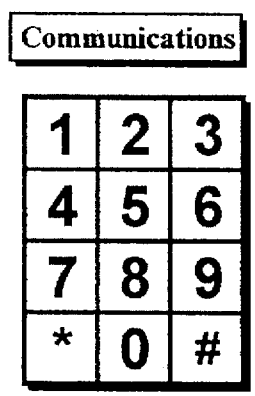
Figure 14C:
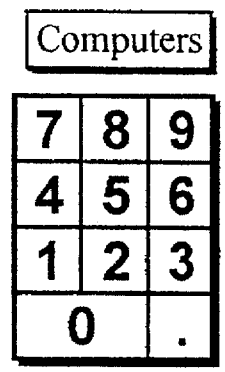
Figure 14D:
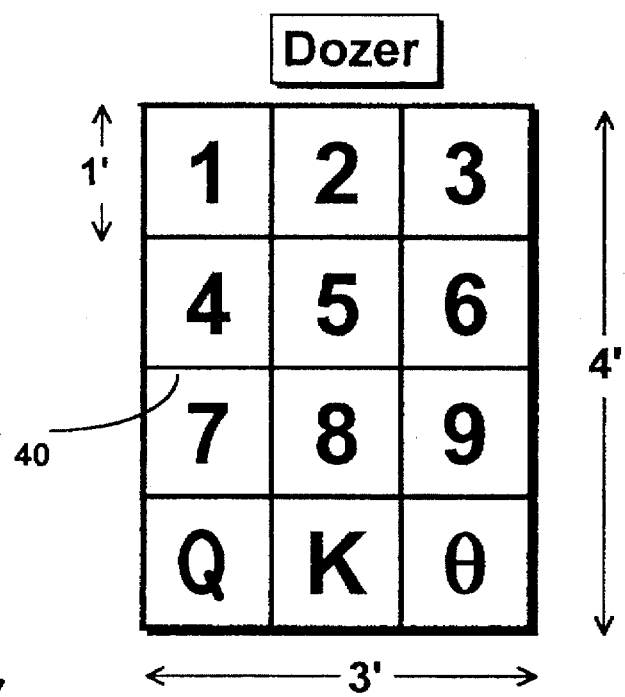

With the "wave-breaking" encoding technique, any analog wave can be described as a series of period wave functions each with a particular wave length 52, amplitude 54 and wave-break 60. FIG. 13e. illustrates an example of digital encoding of a sampled analog wave in terms of brytes, where each "bryte 56" is addressed as a series of ars ending with a number. This procedure not only uses considerably fewer bits than the conventional "sampling" methods, but also provides a more accurate and economical method of encoding analog data in binary form. In conventional "sampling" methods, the conversion of analog data into digital form is limited by the "interval" (time between two sample points) and by the number of "bands" used, for example, a 3-bit code can only represent eight bands, each encompassing 12.5% of the analog signal's range, while a 12-bit code can represent 4096 bands, each encompassing 0.025% of the signal, s range. With the bryte-based coding technique, accuracy is defined by the number of "ars" that is employed to define the wave length 52 and amplitude 54 of each teen wave 50 in addition to the number of "nums" used to define each wave-break 60. The "wave-breaking" method therefore, provides a more accurate and economical encoding procedure for converting analog information into binary form.

The present invention therefor, not only provides a method for describing in binary form the relative position of a sample point in a time-space-light scheme, a sphere paradigm or a sampled analog wave, but also for encoding numbers, letters, symbols and programming commands based on the Vidal principle which states that the universe can be fairly described by means of 12 numerical magnitudes and 4 directional modifiers.

Technology pertaining to different industries such as computers, communications and music are colliding in order to comprise a new science. FIG. 14 illustrates three different keyboards from the piano (FIG. 14a.), the telephone (FIG. 14b.) and the computer (FIG. 14c.) which merge into a "dozer" 40. The present invention thus proposes this novel numerical keypad for the new science. A dozer 40 is a digital keyboard illustrated in FIG. 14d. with a dozen keys arranged in 3 columns by 4 rows, where each key is assigned with one of the dozen nums. A dozer 40 hence, is a digital dozal keyboard based on the teen-metric system that can be used either to type characters or play music.

The fact that the present invention, transforms a piano's "octave" comprised of teen (a dozen) keys into a "dozer" containing also a dozen keys is the foundation of a musical-analog code based on the idea of the AT&T telephone where each of the 12 keys has a distinct sound magnitude. On the basis of the Vidal principle, the remaining four values are addressed as directions which modified the wave length 52 ( left and right direction) and amplitude 54 (up and down direction) of the basic 12 semitones or "brytes". In this way, any letter, symbol or command which has been addressed with the cuyte-based encoding or cuytal system can be instantly converted into the bryte-based encoding or brytal procedure. The present invention supplies hence, a consistent way of TRANSCODING, that is, transforming cuytal information into brytal form and viceversa, given the fact that both codes are mutually correspondent.

In the information age, transition from a decimal method to the teen-metric system can be smooth and painless. As the English mathematician A. C. Aitken put it, "Men will not always evade decision by the facile and procrastinatory". FIGS. 15a–g. illustrate a summary of applications for teen-metric system (base-12) depicted in the "topology of a dozer" demonstrating hereinafter, that the dozal system substitutes all the other numerical bases. In the first stage of the topology, the binary cuyte-based coding procedure (FIG. 15a.) is portrayed where each of the dozen nums is configured with one of the available combinations of on's and off's in sets of 4 bits. This system is transformed then, into a piano's "octave" (FIG. 15b.), where 12 semitones make an octave. A piano, s octave is transformed then into a dozer 40 (FIG. 15c.) where every key is addressed with each of the dozen nums. Through topological changes a dozer is transformed into a teendonut (FIG. 15d.), and then, into a sunter (FIG. 15e.) where a dozen dots describes the position of a sample point at a particular chron of the day. A sunter then, is converted into a teen wave (FIG. 15f.) that is divided into a dozen dots and then horizontally projected into a ruler know as the comter which is divided into a dozen coms. The "comter" (com-counter) is a ruler based on the fact that a dozen keys or "com" (18 mm) make the top of a page (8½".). As an example the top margin of a credit card equals 3 coms (written $3_{,\odot}$), the top width of a diskette is $5_{,\odot}$. The comter therefore, becomes very handy given the fact that it associates three of the most used items in the information era: a computer key, a credit card and a page. Such a ruler is based on a unit of length used by ancient Greeks, Hebrews, Egyptians and Romans, where 1 "digit" was equivalent to 18.5 millimeters and 12 digits made 1 "span".

In the teen-metric system, characters Q and K are used as "nums" because they are the only two "disposable" letters of the English alphabet, the Q was borrowed from the Latin, and the K from the Greek language. Consider for example the word "consequence", it could be spelled as "qonsekuense" or "consecuense" actually, the later makes more sense. With such a procedure, a new high tech language known as Hylan could be constructed. Hylan would be based on three languages—Greek, Latin and English. The Hylanteen system hence, has two dozen capital letters, and a dozen nums (FIG. 16a.), two dozen lower-case letters and a dozen teens (lower-case nums) FIG. 16b.). The suggested notation for arithmetic operations in the proposed context are illustrated in FIG. 16c. With this procedure, caps and lows are not only used for constructing Hylan but also for describing particular numerical positions in the teen-metric method.

The proposed names in Hylan for the nums and some other numericals in the teen-metric system are illustrated in FIG. 17a. providing then, a consistent method for describing large quantities in terms of "nums" and letters of the alphabet, arranging numbers in sets of 4 nums instead of 3 numerals as illustrated in FIG. 17b. The symbols and names of the proposed units in the teen-metric system are depicted in FIG. 17c. The suggested names for the same items for the Spanish language are portrayed in FIGS. 18a. through 18c. The teen-metric system imitates the English pronunciation for counting years in sets of four nums.

The proposed dozal system greatly enhances any operation to be performed. For example, suppose a user can dial up to 100 numbers with a conventional telephone, with a dozal-based telephone system the operator could dial up to $1_{\odot\odot}$ numbers (144 in decimal, 12 times 12), hence expanding by 44% the availability of telephone numbers to be dialed. With the teen-metric system, additional savings in memory storage result, one twenty-fourth (1/24) is equivalent to 0.04166 in decimal but only $_\odot°_\odot{}^6$ in dozal, augmenting efficiency at least 35 per gross. With such an arrangement the user can easily relate diverse procedures such as the Sumerian time system (a dozen chrons make a day) to the Teen spatial system (a dozen coms make a B-com) to the Gregorian Calendar (a dozen months make a year) to the diatonic scale of a Piano (a dozen semitones make an octave).

In summary, with a dozen numerical magnitudes and four directional modifiers, the present invention provides a novel digital encoding method based on 4-bit binary code words for encoding letters, symbols and programming commands. An analog to digital encoding technique converts analog data into binary information by means of "breaking" an analog wave into a multitude of sine waves, each wave with a particular wave-break, wave length and amplitude, supplying hence, an efficient and economical method for processing and storing binary information. A dozal system (base-12) is provided for using an analog device which describes the particular position of the sun at a given time, supplying therefor an apparatus that not only measures time but also describes space.

Although the invention has been disclosed in terms of a preferred embodiment and modifications thereon, it will be understood that numerous additional modifications and variations could be made thereto without departing from the scope of the invention as defined in the following claims.

What is claimed is:

1. A method of encoding analog or digital data comprising the steps of:
   a) selecting a group of 16 four bit code words for encoding said data;
   b) selecting twelve of said sixteen code words for defining twelve numerical magnitudes in a base-12 system; and
   c) selecting the remaining four of said code words as directional modifiers.

2. The method of claim 1, further comprising the steps of:
   d) encoding letters of the alphabet as one of said twelve numerical magnitudes modified by one of said four directional modifiers; and
   e) encoding symbols and programming commands as one of said twelve numerical magnitudes modified by at least two of said four directional modifiers.

3. The method of claim 1, further comprising the steps of:
   g) dividing a circle into twelve fractions;
   e) assigning to each fraction one of said twelve numerical magnitudes;
   f) consecutively dividing each fraction into twelve subfractions; and
   d) assigning to each subfraction one of said twelve numerical magnitudes.

4. The method of claim 1, further comprising the steps of:
   d) describing the position of a sample point along a cone's circumference in terms of said twelve numerical magnitudes;
   e) describing the position of a sample point along a cone's radius in terms of two of said directional modifiers;
   f) describing the position of a sample point within a cone's base in terms of the remaining two of said directional modifiers.

5. The method of claim 1, further comprising the steps of:

d) describing the position of a sample point along a sphere's circumference in terms of said twelve numerical magnitudes;

e) describing the position of a sample point within a sphere's radius in terms of two of said directional modifiers; and f) describing the position of a sample point between one of said sphere's slides in terms of various combinations of the remaining two of the directional modifiers of the method referred in claim 1.

6. The method of claim 1, further comprising the steps of:

d) dividing a period wave into twelve fractions; and e) assigning to each said fraction one of said twelve numerical magnitudes.

7. The method of claim 6, further comprising the steps of:

f) describing the wavelength of said periodic wave in terms of two of said directional modifiers; and g) describing the amplitude of said period wave in terms of the remaining two of said directional modifiers.

8. The method of claim 7, further comprising the steps of:

h) breaking an analog wave into a plurality of periodic wave segments each with a particular wave length, amplitude and function;

i) defining a wave break as the precise position where the sample analog wave has a change of function; and j) describing every wave break of each periodic wave segment in terms of said numerical magnitudes.

9. The method of claim 8 further providing the steps of:

k) defining the wave length and amplitude of each periodic wave segment in terms of said four directional modifiers.

* * * * *